(12) United States Patent
Parthasarathy

(10) Patent No.: US 9,262,931 B2
(45) Date of Patent: Feb. 16, 2016

(54) SYSTEM AND METHOD FOR GRAPHICALLY GENERATING AN APPROACH/DEPARTURE COURSE

(71) Applicant: HONEYWELL INTERNATIONAL INC., Morristown, NJ (US)

(72) Inventor: Sudarshan Parthasarathy, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 103 days.

(21) Appl. No.: 13/708,299

(22) Filed: Dec. 7, 2012

(65) Prior Publication Data

US 2014/0163784 A1 Jun. 12, 2014

(51) Int. Cl.
G06F 19/00 (2011.01)
G06G 7/70 (2006.01)
G08G 5/02 (2006.01)
G01C 23/00 (2006.01)
G08G 5/00 (2006.01)

(52) U.S. Cl.
CPC ........ *G08G 5/02* (2013.01); *G01C 23/00* (2013.01); *G08G 5/0021* (2013.01); *G08G 5/0034* (2013.01); *G08G 5/025* (2013.01)

(58) Field of Classification Search
CPC ......... G08G 5/02; G08G 5/0021; G01C 23/00
USPC ............................ 701/3, 16, 467, 15; 715/771
See application file for complete search history.

(56) References Cited

U.S. PATENT DOCUMENTS

| | | | |
|---|---|---|---|
| 4,675,676 A | 6/1987 | Takanabe et al. | |
| 5,340,061 A | 8/1994 | Vaquier et al. | |
| 5,959,625 A | 9/1999 | Betrisey et al. | |
| 5,978,715 A * | 11/1999 | Briffe et al. | 701/11 |
| 5,995,901 A | 11/1999 | Owen et al. | |
| 6,112,141 A | 8/2000 | Briffe et al. | |
| 6,389,355 B1 | 5/2002 | Gibbs et al. | |
| 6,438,469 B1 * | 8/2002 | Dwyer et al. | 701/16 |
| 6,449,556 B1 | 9/2002 | Pauly | |
| 6,571,171 B1 | 5/2003 | Pauly | |
| 6,633,810 B1 | 10/2003 | Qureshi et al. | |

(Continued)

FOREIGN PATENT DOCUMENTS

EP 2136276 A1 12/2009
EP 2362183 A1 8/2011

(Continued)

OTHER PUBLICATIONS

EP Exam Report for Application 13171568.2, dated May 28, 2014.

(Continued)

*Primary Examiner* — Tuan C. To
*Assistant Examiner* — Isaac Smith
(74) *Attorney, Agent, or Firm* — Ingrassia Fisher & Lorenz, P.C.

(57) ABSTRACT

A system and method for graphically creating an approach course on a navigation display is provided. A processor operatively coupled to a display and is configured to generate an approach course by (1) generating a graphical representation of at least one terminal area procedure, (2) selecting the at least one terminal area procedure on the display, and (3) displaying the approach course including the at least one terminal area procedure. The approach course is then accepted and inserted into a flight plan.

19 Claims, 12 Drawing Sheets

(56) References Cited

U.S. PATENT DOCUMENTS

| | | | |
|---|---|---|---|
| 6,707,475 B1* | 3/2004 | Snyder | 715/771 |
| 7,421,319 B2 | 9/2008 | Stefani | |
| 8,073,578 B1 | 12/2011 | McCusker | |
| 8,209,122 B2 | 6/2012 | Nichols et al. | |
| 8,234,059 B2 | 7/2012 | Sugiyama et al. | |
| 8,380,366 B1 | 2/2013 | Schulte | |
| 8,880,245 B2 | 11/2014 | Leberquer et al. | |
| 2003/0036827 A1 | 2/2003 | Murphy | |
| 2008/0021648 A1 | 1/2008 | Wilson | |
| 2008/0294335 A1* | 11/2008 | Bitar et al. | 701/206 |
| 2009/0288036 A1 | 11/2009 | Osawa et al. | |
| 2010/0318573 A1 | 12/2010 | Yoshikoshi | |
| 2011/0320068 A1 | 12/2011 | Lee et al. | |
| 2013/0013133 A1 | 1/2013 | Walter | |
| 2014/0032105 A1 | 1/2014 | Kolbe et al. | |
| 2014/0074323 A1 | 3/2014 | Andre et al. | |

FOREIGN PATENT DOCUMENTS

| | | |
|---|---|---|
| EP | 2679959 A1 | 1/2014 |
| GB | 1206693 | 9/1970 |
| WO | 2010089805 A1 | 8/2010 |

OTHER PUBLICATIONS

USPTO Office Action for U.S. Appl. No. 13/531,786; Notification date Jul. 31, 2013.

Buying a GPS Navigation Device, TomTom GPS Devices; http://voices.yahoo.com/buying-gps-navigation-device-8200335.html.

Functionally enhanced Metrology Software allowing open access to CMM CAD Performance; http://www.wenzelamerica.com/Software_OpenDMIS.aspx.

Aerial Camera, CCNS5—new FMS from IGI; http://www.aerial-survey-base.com/blog/ccns5-new-fms-from-igi.

EP Search Report for application No. 13171568.2 dated Apr. 28, 2014.

Are Touchscreens Here to Stay? Left Seat; Sport Aviation forum; macsblog.com/2012/01are-touchscreens-here-to-stay/. Posted on Jan. 25, 2012 by Mac.

ARINC Direct adds graphical route modification to flight planning capabilities; BlueSky Business Aviation News; www.blueskynews.aero/issue_147/arinc_adds_GRM_to_flight_planning_capabilities.htm, [Retrieved from Internet Dec. 16, 2013].

EP Examination Report for Application No. 13171568.2 dated Feb. 9, 2015.

EP Examination Report for Application No. 13171568.2-1557 dated Sep. 24, 2015.

USPTO Final Office Action, Notification Date May 18, 2015; U.S. Appl. No. 14/216,200.

EP Extended Search Report for Application No. 15157260.9 dated Aug. 26, 2015.

USPTO Notice of Allowance and Fee(s) Due for U.S. Appl. No. 14/216,200 dated Oct. 21, 2015.

* cited by examiner

SYSTEM AND METHOD FOR GRAPHICALLY GENERATING AN APPROACH/DEPARTURE COURSE

TECHNICAL FIELD

Embodiments of the subject matter described herein relate generally to graphical selections on display systems. More particularly, embodiments of the subject matter described herein relate to a display system and method for graphically creating an approach/departure course.

BACKGROUND

Avionics display systems have been deployed aboard aircraft to visually convey a considerable amount of flight information in an intuitive and readily comprehendible manner. In conventional avionics display systems, much of the information is visually expressed on cockpit displays, such as an Interactive Navigation (INAV) or a multipurpose control display unit (MCDU). A pilot may use either INAV or MCDU to select an approach/departure course (e.g. flight course) comprised of terminal area procedures such as runway, approach, approach transition, standard terminal arrival route (STAR), and STAR transition. Each terminal area procedure is individually and textually selected, without the benefit of a visual or graphical representation. Thus, the pilot may be unaware of the terrain and traffic information associated with the flight course.

To avoid this problem the pilot may do one of two things. The pilot may refer to flight charts to visualize the procedure being selected. However, this increases the pilot's workload during a critical descent phase of the flight. Alternatively, the pilot may select the terminal area procedures and enter it into the temporary flight plan to obtain a graphical representation of the flight course. However, this process requires the pilot to select, visualize, and modify the flight course until the temporary flight plan meets the pilot's requirements. This process again increases the pilot's workload during a critical descent phase of the flight. In addition, if the pilot utilizes the INAV screen to select the procedure, a selection dialog box will prevent the pilot from visualizing what is under the dialog box (e.g. weather, terrain, traffic, ADS-B IN information, etc.). In fact, the dialog box may cover-up as much as 25% of the INAV screen including a significant amount of the displayed information.

Although such systems represent improvements in avionics technology, further enhancements to cockpit displays to make them more intuitive and easier to use may be desirable.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In accordance with the foregoing, there is provided a method for graphically creating a flight course on a display. The method comprises generating a graphical representation of at least one terminal area procedure, selecting the at least one terminal area procedure, and displaying a flight course including the at least one terminal area procedure.

There is also provided a display system for graphical creation of an approach course. A processor is operatively coupled to a display system and configured to generate an approach course by (1) generating a graphical representation of at least one terminal area procedure, (2) selecting the at least one terminal area procedure on the display, and (3) displaying the approach course including the at least one terminal area procedure.

A method for graphically creating an approach course on a navigation display is also provided. The method comprises, generating a graphical representation of a plurality of terminal area procedures, selecting one of the plurality of terminal area procedures, and displaying the approach course. The approach course is then accepted and inserted into a flight plan.

DETAILED DESCRIPTION

Figure 1:
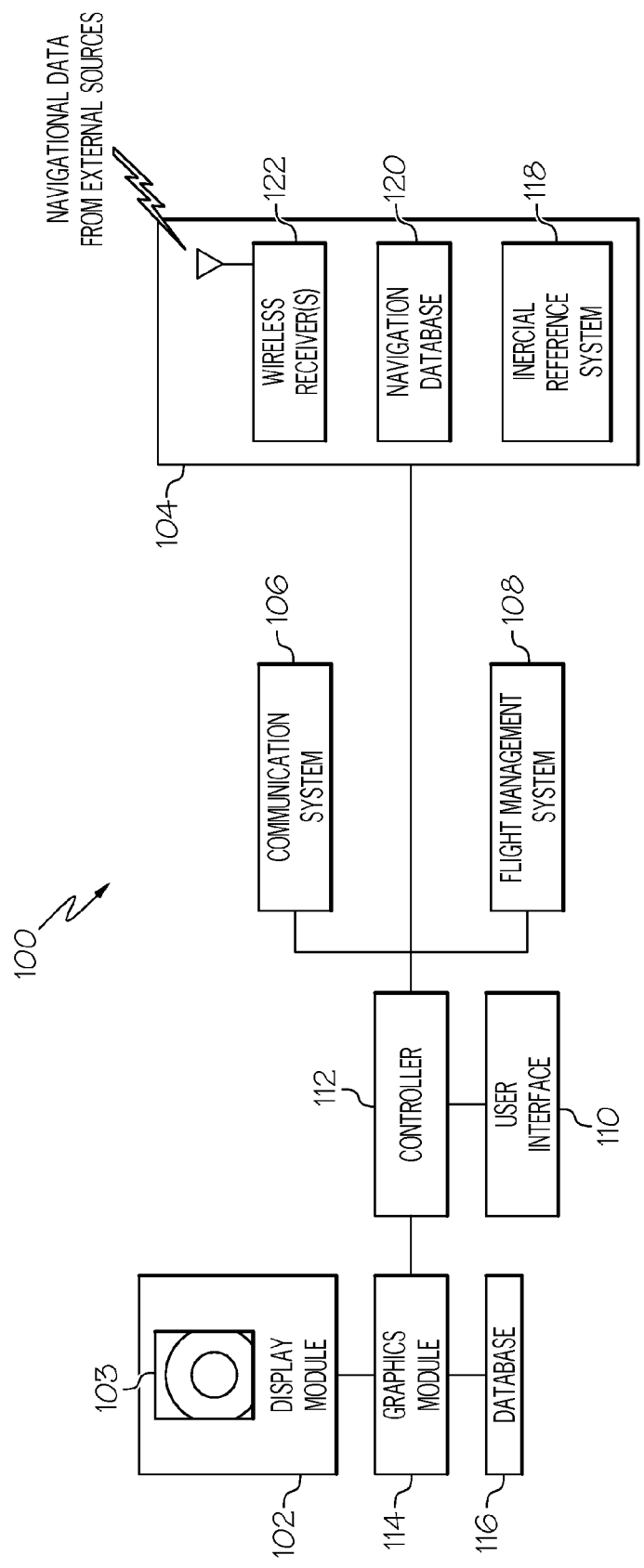
FIG. 1 is a block diagram of an information display system suitable for use in an aircraft in accordance with an embodiment.

The following detailed description is merely exemplary in nature and is not intended to limit the subject matter of the application and uses thereof. Furthermore, there is no intention to be bound by any theory presented in the preceding background or the following detailed description. Presented herein for purposes of explication is a certain exemplary embodiment of how a flight course (e.g. approach or departure course) may be graphically generated. For example, a graphical generation of an approach course will be discussed. However, it should be appreciated that this explicated example embodiment is merely an example and a guide for implementing the novel display system and method for graphically creating an approach/departure course. As such, the examples presented herein are intended as non-limiting.

Techniques and technologies may be described herein in terms of functional and/or logical block components and with reference to symbolic representations of operations, processing tasks, and functions that may be performed by various computing components or devices. It should be appreciated that any number of hardware, software, and/or firmware components configured to perform the specified functions may realize the various block components shown in the figures. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to aircraft display systems adapted for graphically selecting the flight course. A user can visualize the approach course, allowing for a quick and proper selection of the flight course. The overall workload on the user is reduced and the graphical adjustment is implemented in a manner that improves situational awareness. In addition, an embodiment may allow for fuel conservation, reducing required time, and earlier error detection in selecting the flight course.

FIG. 1 depicts an exemplary embodiment of an aircraft display system 100. In an exemplary embodiment, the display system 100 includes, without limitation, a display device 102 for displaying a graphical flight plan image 103, a navigation system 104, a communications system 106, a flight management system (FMS) 108, a controller 112, a graphics module 114, a user interface 110, and a database 116 suitably configured to support operation of the graphics module 114 and display device 102, as described in greater detail below. Navigation system 104 may include an inertial reference system 118, a navigation database 120 and one or more wireless receivers 122 for receiving navigational data from external sources in a well-known manner.

It should be understood that FIG. 1 is a simplified representation of a display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the controller 112 for obtaining and/or providing real-time flight-related information that may be displayed on the display device 102.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey one or more graphical representations or images of the approach course on the display device 102. As stated previously, navigational system 104 includes an inertial reference system 118, a navigation database 120, and at least one wireless receiver 122. Inertial reference system 118 and wireless receiver 122 provide controller 112 with navigational information derived from sources onboard and external to the host aircraft, respectively. More specifically, inertial reference system 118 provides controller 112 with information describing various flight parameters of the host aircraft (e.g., position, orientation, velocity, etc.) as monitored by a number of motion sensors (e.g., accelerometers, gyroscopes, etc.) deployed onboard the aircraft. By comparison, and as indicated in FIG. 1, wireless receiver 122 receives navigational information from various sources external to the aircraft. These sources may include various types of navigational aids (e.g., global position systems, non-directional radio beacons, very high frequency Omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

Navigation database 120 stores information required to construct flight plans and approach courses. For example, the navigation database 120 may contain information pertaining to the geographical location of reference points (e.g. waypoints) and line segments that connect the waypoints (e.g., legs) for various terminal area procedures. Such procedures may include runways, approaches, approach transitions, standard terminal arrival route (STAR), and STAR transitions, each to be discussed in detail below. The runway procedure will define the runways for an airport, while the approach procedure will define the flight path that should be followed for the selected runway. For example, Los Angeles International Airport (LAX) has multiple runways and various approaches for each runway. The approach transition procedure will further define the proper position of the aircraft for the selected approach and runway. The STAR and STAR transition procedure will further define the required flight course for the selected approach.

Controller 112 is coupled to the navigation system 104 for obtaining real-time navigational data and/or information regarding operation of the aircraft to support operation of the display system 100. In an exemplary embodiment, the communications system 106 is coupled to the controller 112 and configured to support communications to and/or from the aircraft, as is appreciated in the art. The controller 112 is also coupled to the flight management system 108, which in turn, may also be coupled to the navigation system 104 and the communications system 106 for providing real-time data and/or information regarding operation of the aircraft to the controller 112 to support operation of the aircraft. In an exemplary embodiment, the user interface 110 is coupled to the controller 112, and the user interface 110 and the controller 112 are cooperatively configured to allow a user to interact with display device 102 and other elements of display system 100, as described in greater detail below.

In an exemplary embodiment, the display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the remainder of display system 100 and enables a user to select content displayed on the display device 102, as described in greater detail below. In various embodiments, the user interface 110 may be realized as a keypad, touchpad, keyboard, mouse, touchscreen, joystick, knob, microphone, or another suitable device adapted to receive input from a user. In preferred embodiments, user interface 110 may be a touchscreen, cursor control device, joystick, or the like.

In an exemplary embodiment, the navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

In an exemplary embodiment, the communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

The controller 112 and/or graphics module 114 are configured in an exemplary embodiment to display and/or render information pertaining to the flight plan on the display device 102 to allow a user (e.g., via user interface 110) to review various aspects (e.g., estimated flight time, rates of ascent/descent, flight levels and/or altitudes, and the like) of the flight plan. The controller 112 generally represents the hardware, software, and/or firmware components configured to facilitate the display and/or rendering of a navigational map on the display device 102 and perform additional tasks and/or functions described in greater detail below. Depending on the embodiment, the controller 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The controller 112 may also be implemented as a combination of computing devices, e.g., a combination of a digital signal processor and a microprocessor, a plurality of microprocessors, one or more microprocessors in conjunction with a digital signal processor core, or any other such configuration. In practice, the controller 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the controller 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise an approach course database, terrain database, a weather database, a flight plan database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
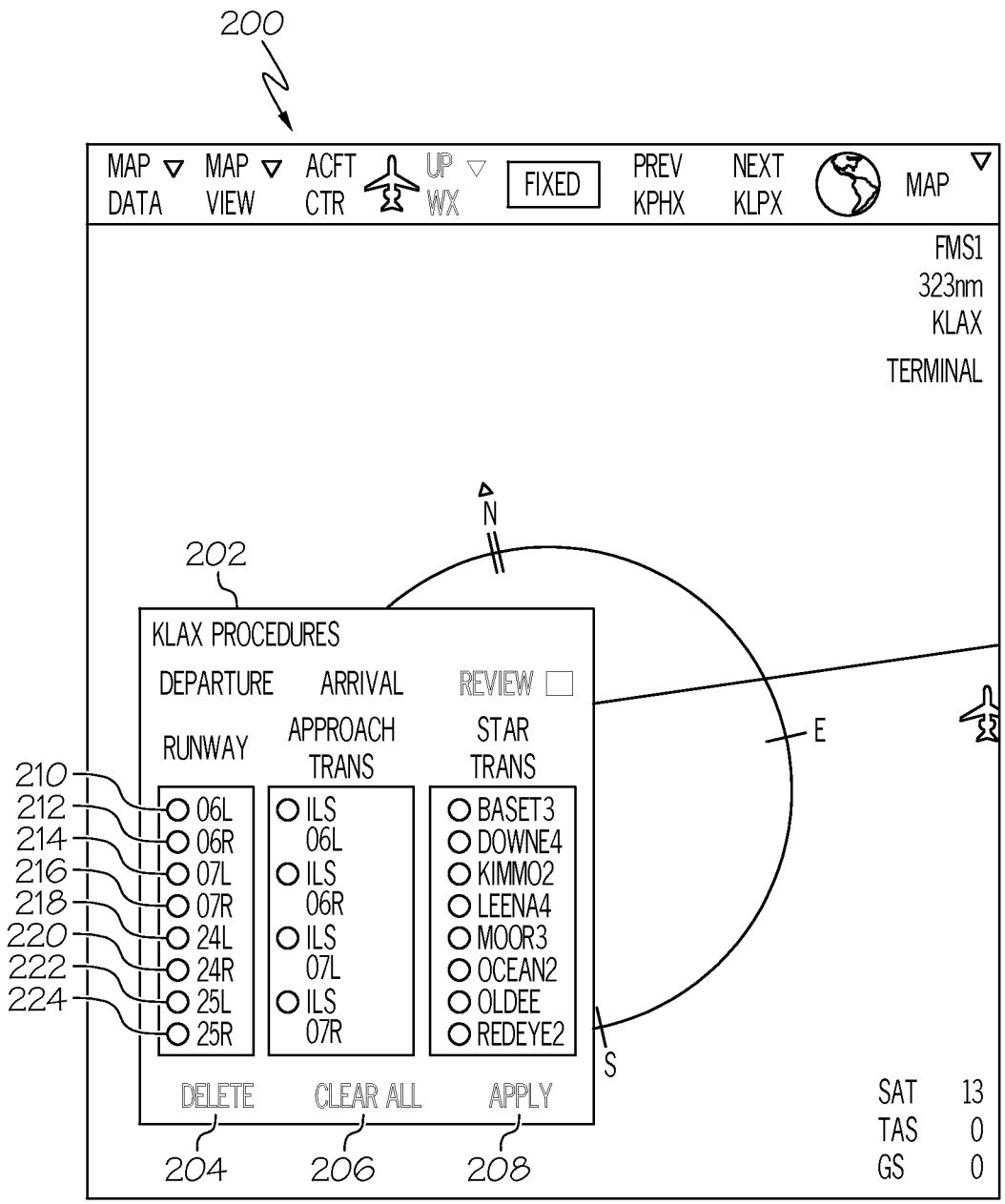
FIGS. 2 and 3 are graphical representations of navigational maps known for displaying menus for selecting terminal area procedures.

FIG. 2 is a graphical representation 200 of a flight plan image including a dialog box menu 202 known for selecting an approach course. The dialog box menu 202 includes terminal area procedures that are discussed in further detail below, a "Delete" button 204, a "Clear All" button 206, and an "Apply" button 208. The terminal area procedures may include runways, approaches, approach transitions, STAR, and STAR transitions. The approach, approach transition, STAR, and STAR transition include sets of waypoints that represent segments of an approach course from the top of the decent to a runway. The STAR transition is the first segment of the approach course starting at the top of the decent to the STAR segment of the approach course. The STAR segment is between the STAR transition and the approach transition, which positions the aircraft for the final approach to the runway. The final approach is characterized by the approach transition and approach procedures, which are the final segments before landing on the runway. For example, KLAX airport has eight runways 210, 212, 214, 216, 218, 220, 222, and 224, which are displayed in the left column of the dialog box menu 202, multiple approach transitions displayed in the middle column 201 of the dialog box menu 202, and multiple STAR transitions displayed in the right column 203 of the dialog box menu 202.

Figure 3:
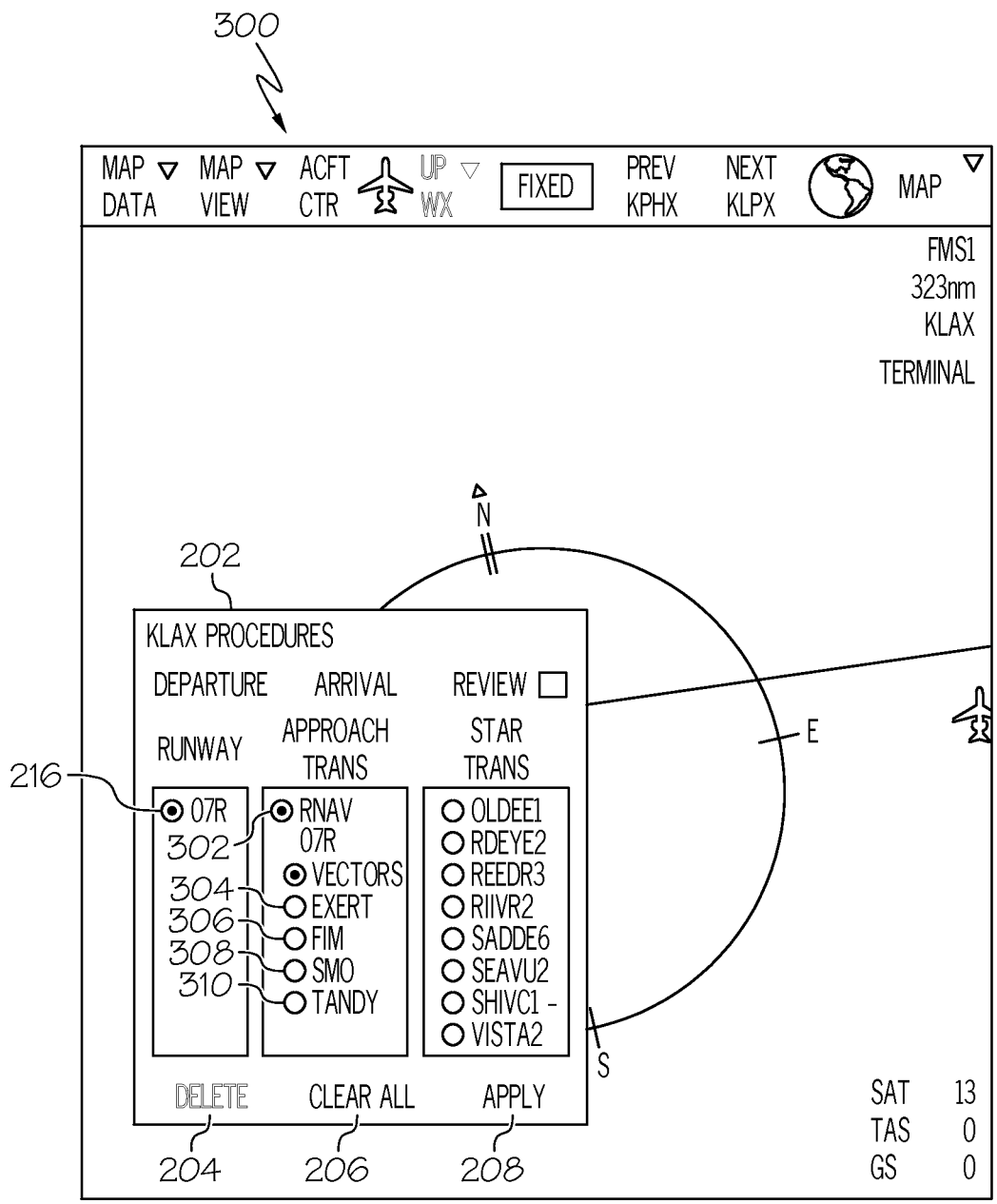

FIG. 3 is a graphical representation 300 of a flight plan image including the dialog box menu 202, known for selecting the approach transition, where both a runway "07R" 216 and an approach "RNAV07R" 302 have already been selected. After at least one terminal area procedure has been selected the subsequent available terminal area procedures are reduced to only the procedures that are compatible with the previous selections. This ensures that the user cannot select incompatible terminal area procedures when creating an approach course. For example, only approach transitions "EXERT" 304, "FIM" 306, "SMO" 308 and "TANDY" 310 are available after selecting runway 216 in column 201 and approach 302 in column 203. After a terminal area procedure has been selected, the "Apply" 208 button will become available to accept the terminal area procedure. After a terminal area procedure has been selected/changed, the "Apply" 208 button will become available to accept the terminal area procedure and the user will be able to insert them into the temporary flight plan creating the first graphical display of the approach course. In addition, if the user receives instructions to follow a different approach course after selecting at least one terminal area procedure, the user may select the "Clear All" 206 button, clearing all previous selections made by the user. After this button is selected the user must reselect all terminal area procedures including the runway, approach, approach transition, STAR and STAR transition.

Figure 4:
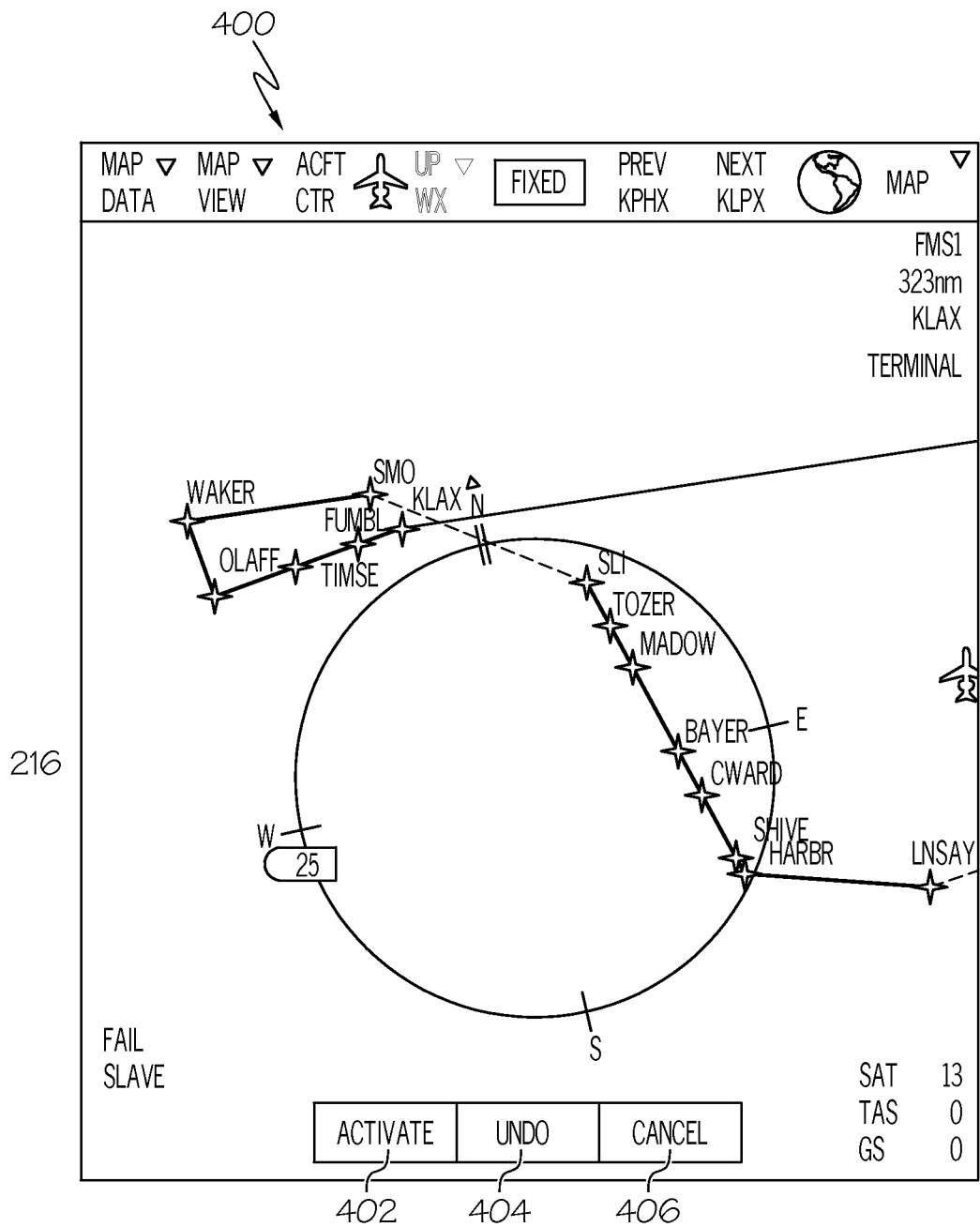
FIG. 4 illustrates a graphical representation of the approach course characterized by the selected terminal area procedures.

FIG. 4 is a graphical representation 400 of a temporary flight plan image known for displaying the first graphical image of the approach course from the selected terminal area procedures. The temporary flight plan image includes all selected terminal area procedures depicted by the line segments (e.g. legs) connecting reference points together shown as stars (e.g. waypoints). An "Activate" button 402, "Undo" button 404 and "Cancel" button 406 are displayed on the lower part of the screen. The "Activate" button 402 allows the user to approve the approach course displayed on the temporary flight plan. However, if the user disapproves of the approach course, the user may select the "Cancel" button 406 that cancels the created approach course.

Unfortunately, there is no graphical representation of the approach course until all required terminal area procedures are selected and entered into the temporary flight plan shown in FIG. 3. In addition, the dialog box menu 202 may occupy a large portion of the display and therefore blocks and hides portions of the display, as shown in FIGS. 2 and 3. Such portions may include parts of the existing flight plan, terrain, weather, traffic, and ADS-B IN data. The problem is exacerbated because the dialog box 202 is stationery and cannot be moved, for example, by dragging with a cursor to reveal what is underneath.

It is contemplated that the embodiments described herein provide a system and method for graphically creating the flight course (e.g. approach course) in a manner that provides immediate visual feedback of the terrain, traffic, and spatial orientation of the terminal area procedures. In addition, all selections are made without hiding a substantial portion of the display or the features being shown on the display. This would enable the user to request clearance for an alternative approach course that could result in the saving of fuel or time.

Figure 5:
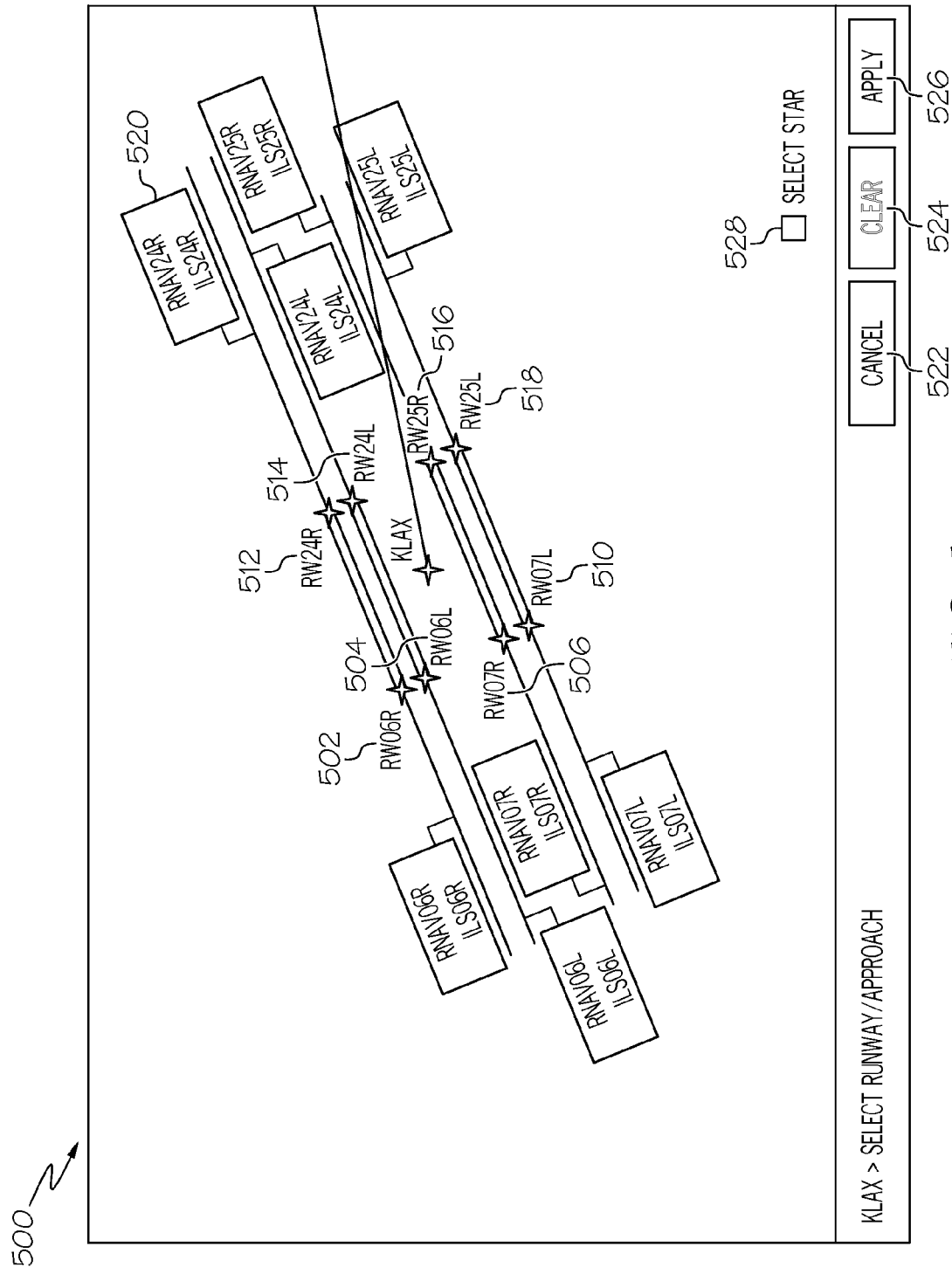
FIG. 5 is a graphical representation of runways on a navigational map for a given airport useful for illustrating how a runway may be selected using the display process of FIG. 12 in accordance with a further embodiment.

FIG. 5 illustrates an interactive graphical display 500 for graphically selecting terminal area procedures including runways and approaches available at KLAX airport. The interactive graphical display 500 shows the eight available runways 502, 504, 506, 508, 510, 512, 514, 516, and 518 and the corresponding approach procedure for each runway. For example, if the user selects runway "RW24R" 512, the corresponding approaches for that selected runway are "RNAV24R" and "ILS24R", shown in box 520. The interactive graphical display 500 includes "Cancel", "Clear", and "Apply" buttons 522, 524, and 526, respectively. Included on the display is a "Select STAR" button 528 that allows for the STAR and STAR transition to be selected prior to selecting the approach and approach transition. This flexible approach allows the pilot or user to enter all known information at the earliest time, thus reducing the work load required by the user at the critical descent phase of the flight.

Figure 6:
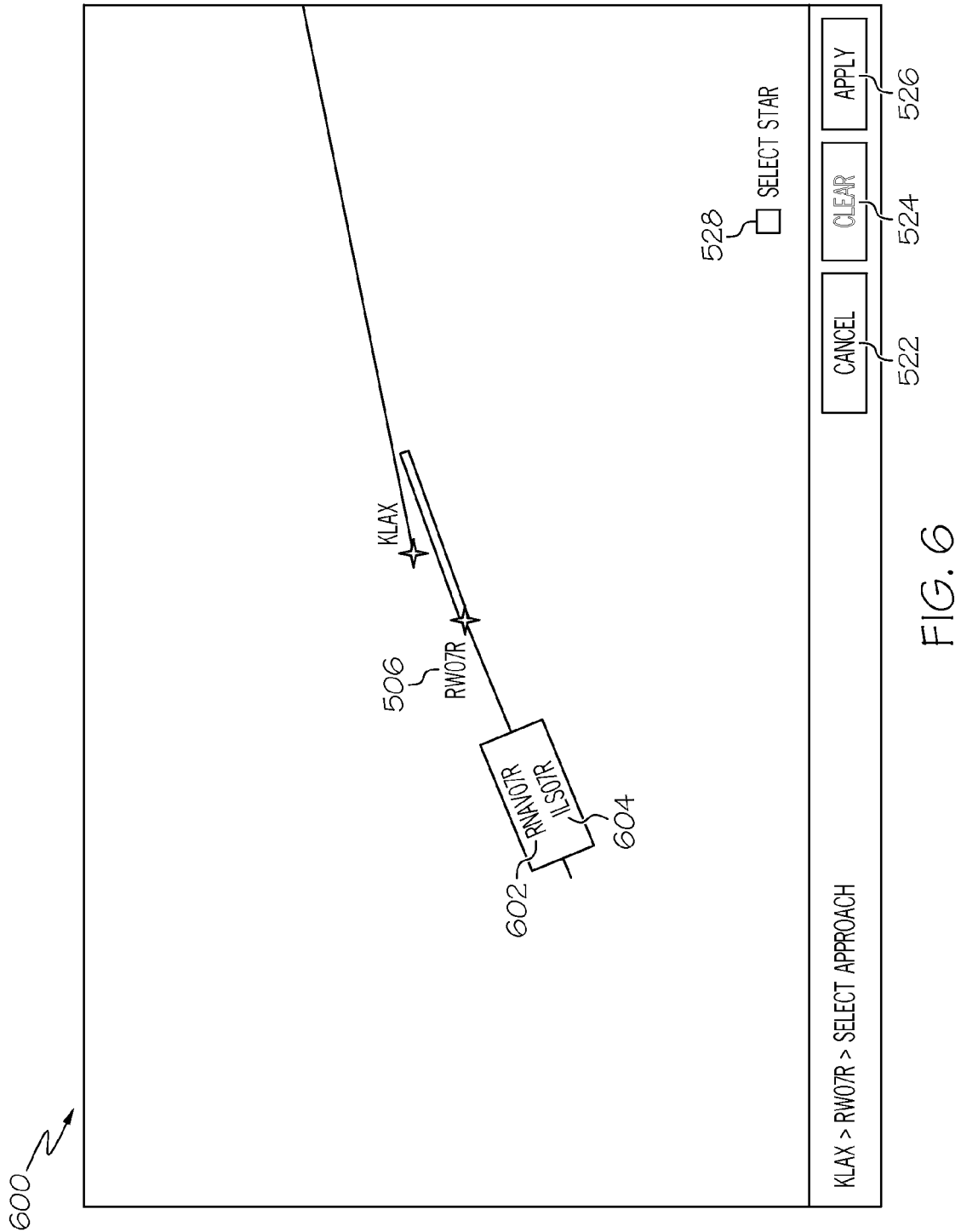
FIG. 6 is a graphical representation of available approach procedures based on a selected runway on a navigational map for a given airport and illustrates how an approach procedure may be selected using the display process of FIG. 12 in accordance with an embodiment.

FIG. 6 illustrates an interactive graphical display 600 for graphically selecting terminal area procedures including corresponding approaches available after runway 506 has been selected at KLAX airport. For example, after the user has selected runway "RW07R" 506, the approaches "RNAV07R" 602 and "ILS07R" 604 are graphically displayed for consideration and selection by the user. After the approach has been selected, the runway and approach are displayed in a similar color, which allows the user to visualize the chose terminal area procedures. In addition, the interactive graphical display 600 includes "Cancel", "Clear", "Apply", and "Select STAR" buttons 522, 524, 526, and 528 respectively.

Figure 7:
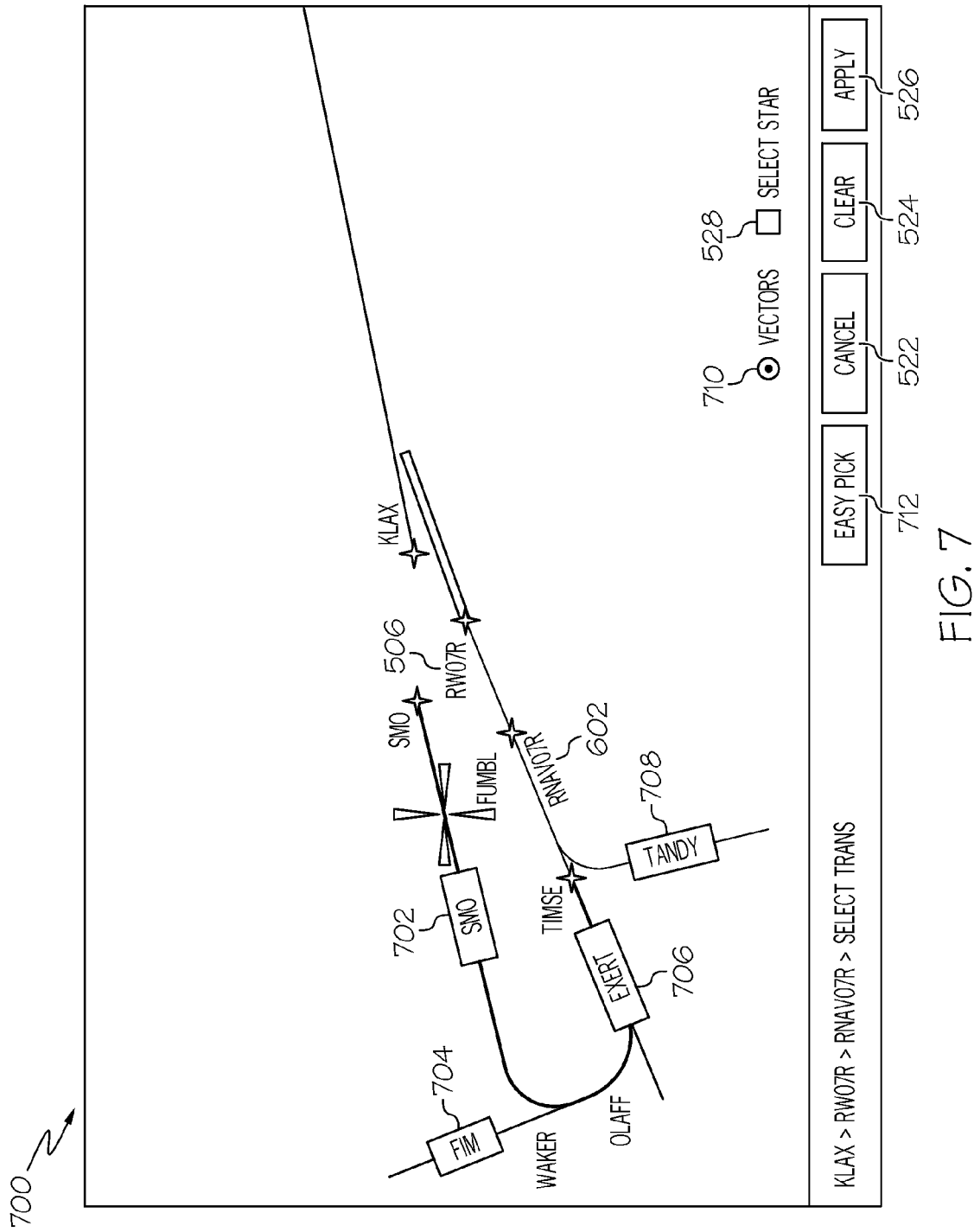
FIG. 7 is a graphical representation of available approach transition procedures based on a selected runway and approach on a navigational map for a given airport and illustrates how an approach transition procedure may be selected using the display process of FIG. 12 in accordance with a further embodiment.

FIG. 7 illustrates an interactive graphical display 700 for graphically selecting terminal area procedures including corresponding approach transition procedures available given the selected runway 506 and the approach 602 at KLAX airport. The subsequent corresponding available approach transitions are shown in vector format due to the default selection of 710, which displays "SMO" 702, "FIM" 704, "EXERT" 706, and "TANDY" 708, based on the previous selections. In addition, the interactive graphical display 700 includes "Cancel", "Clear", "Apply", and "Select STAR" buttons 522, 524, 526, and 528 respectively. The user may place the cursor over (e.g. hover) an approach transition (e.g "SMO" 702), displaying a plurality of waypoints connected by line segments that define the terminal area procedure. To ensure the user can differentiate between the non-selected terminal area procedures are displayed in a substantially different color then the selected terminal area procedures. This allows for the user can visualize all possible terminal area procedures before choosing the most suitable procedure. This also provides the user with spatial orientation prior to making a selection. If it becomes apparent that there is a terminal area procedure that can save fuel or time, the user can request clearance for that procedure. The user may also select the "Easy Pick" button 712, which allows the user to make a selection of the possible available combinations of terminal area procedures and their associated information as displayed in FIG. 11.

Figure 8:
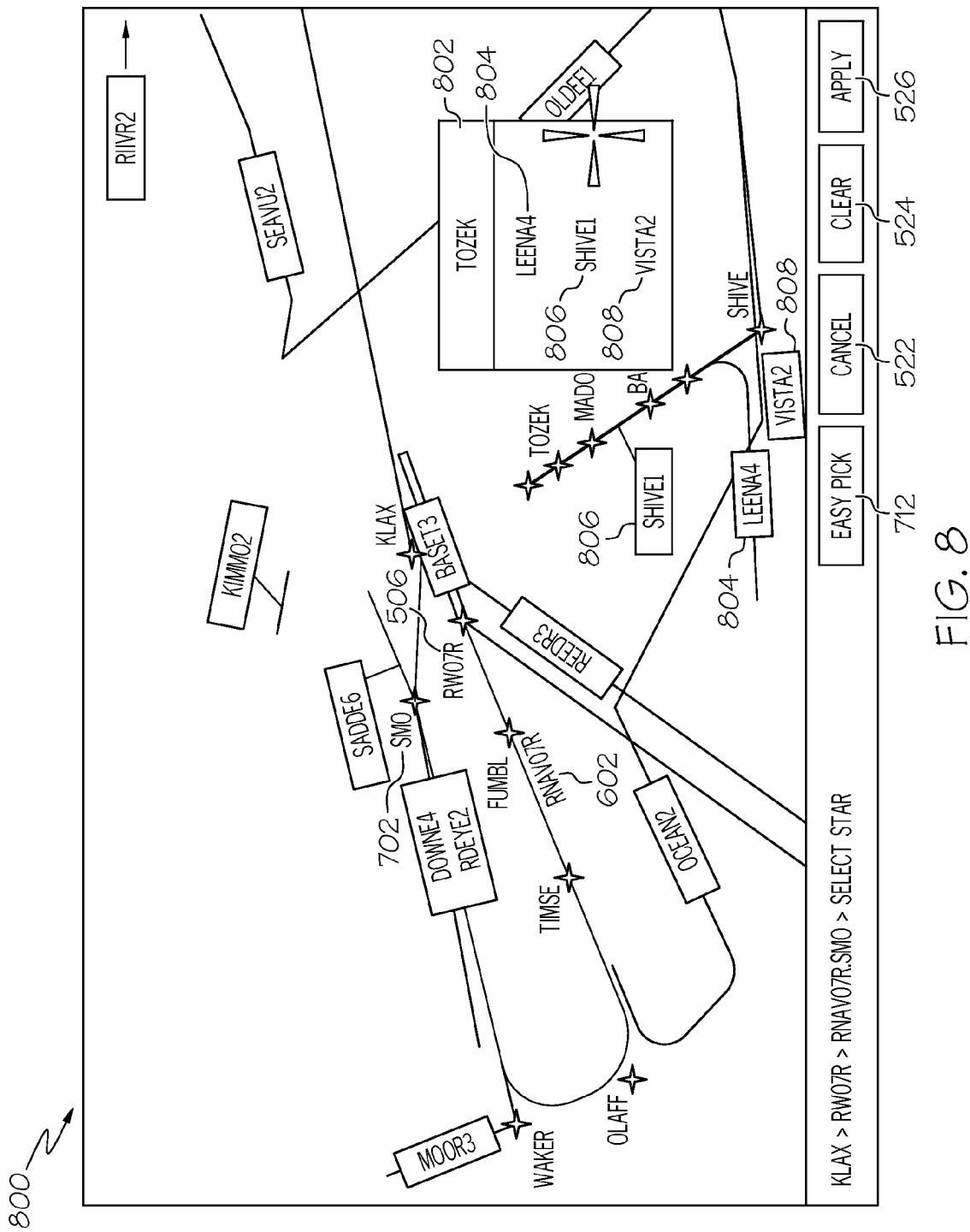
FIG. 8 is a graphical representation of available STAR procedures based on a selected runway, approach, and approach transition on a navigational map for a given airport and illustrates how a STAR procedure may be selected using the display process of FIG. 12 in accordance with a still further embodiment.

FIG. 8 illustrates an interactive graphical display 800 for graphically selecting terminal area procedures including corresponding STAR procedures available given the selected runway 506, approach 602 and approach transition 702 at KLAX airport. In addition, the interactive graphical display 800 includes "Cancel", "Clear", "Apply", and "Easy Pick" buttons 522, 524, 526, and 712, respectively. As described above, the cursor may be placed over a terminal area procedure to display the details of that procedure. In addition, a dialog box menu may appear permitting the user to easily select the desired procedure if the leg is a part of multiple terminal area procedures. For example, the dialog box menu 802 displays the STAR procedures "LEENA4" 804, "SHIVE1" 806, and "VISTA2" 808 that share the same leg. The user can move this dialog box, if it covers an area of interest to avoid the issues described above in accordance with FIG. 2.

Figure 9:
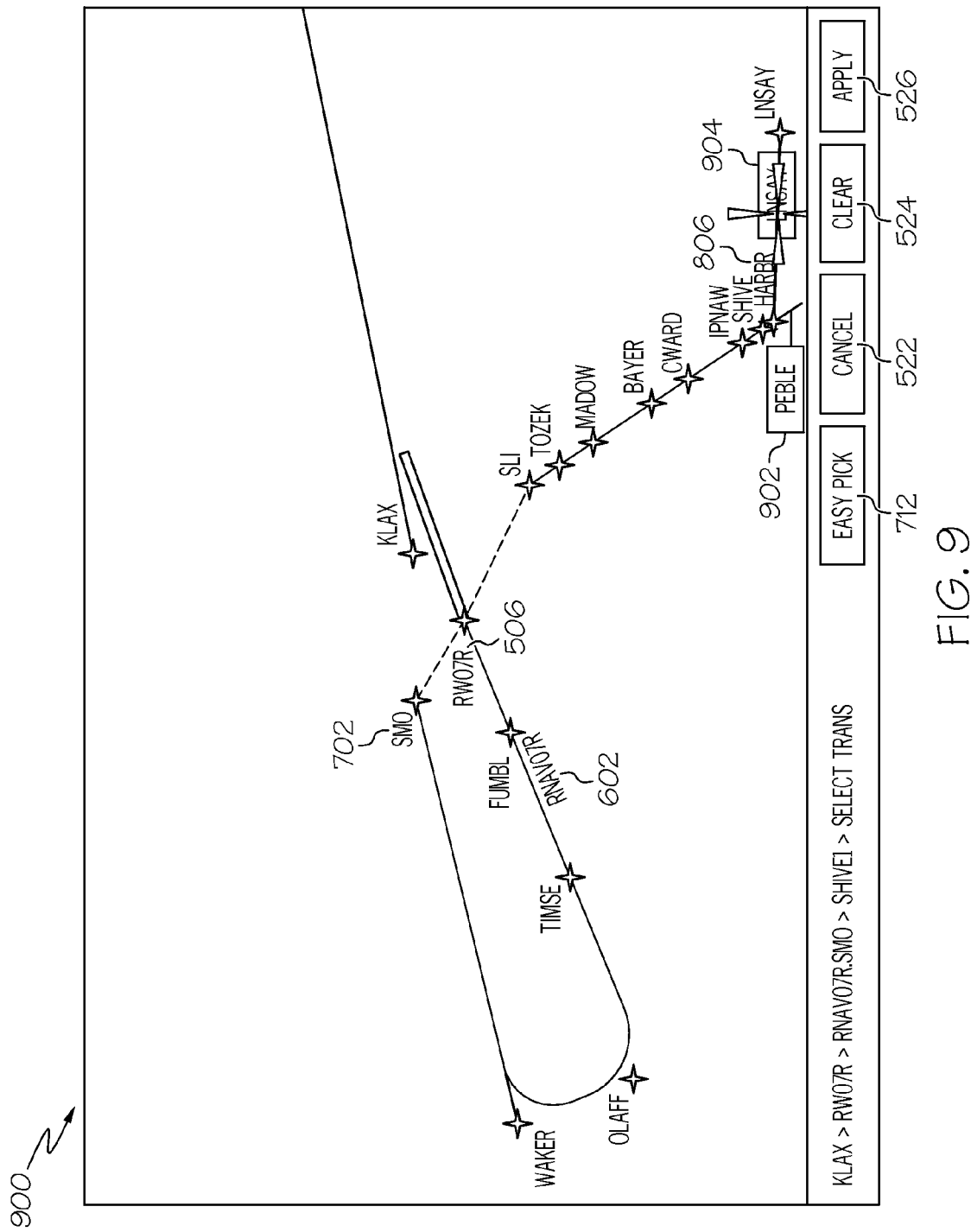
FIG. 9 is a graphical representation of available STAR transition procedures based on a selected runway, approach, approach transition, and STAR on a navigational map for a given airport and illustrates how a STAR transition procedure may be selected using the display process of FIG. 12 in accordance with yet another further embodiment.

FIG. 9 illustrates an interactive graphical display 900 for graphically selecting terminal area procedures including corresponding STAR transition procedures available given the selected runway 506, approach 602, approach transition 702 and STAR 806 at KLAX airport. In addition, the interactive graphical display 800 includes "Cancel", "Clear", "Apply", and "Easy Pick" buttons 522, 524, 526, and 712, respectively. Based on the previous selections only the corresponding STAR transitions "PEBLE" 902 and "LNSAY" 904 are displayed for the user to select, ensuring that all displayed sections are compatible to previous selections.

Figure 10:
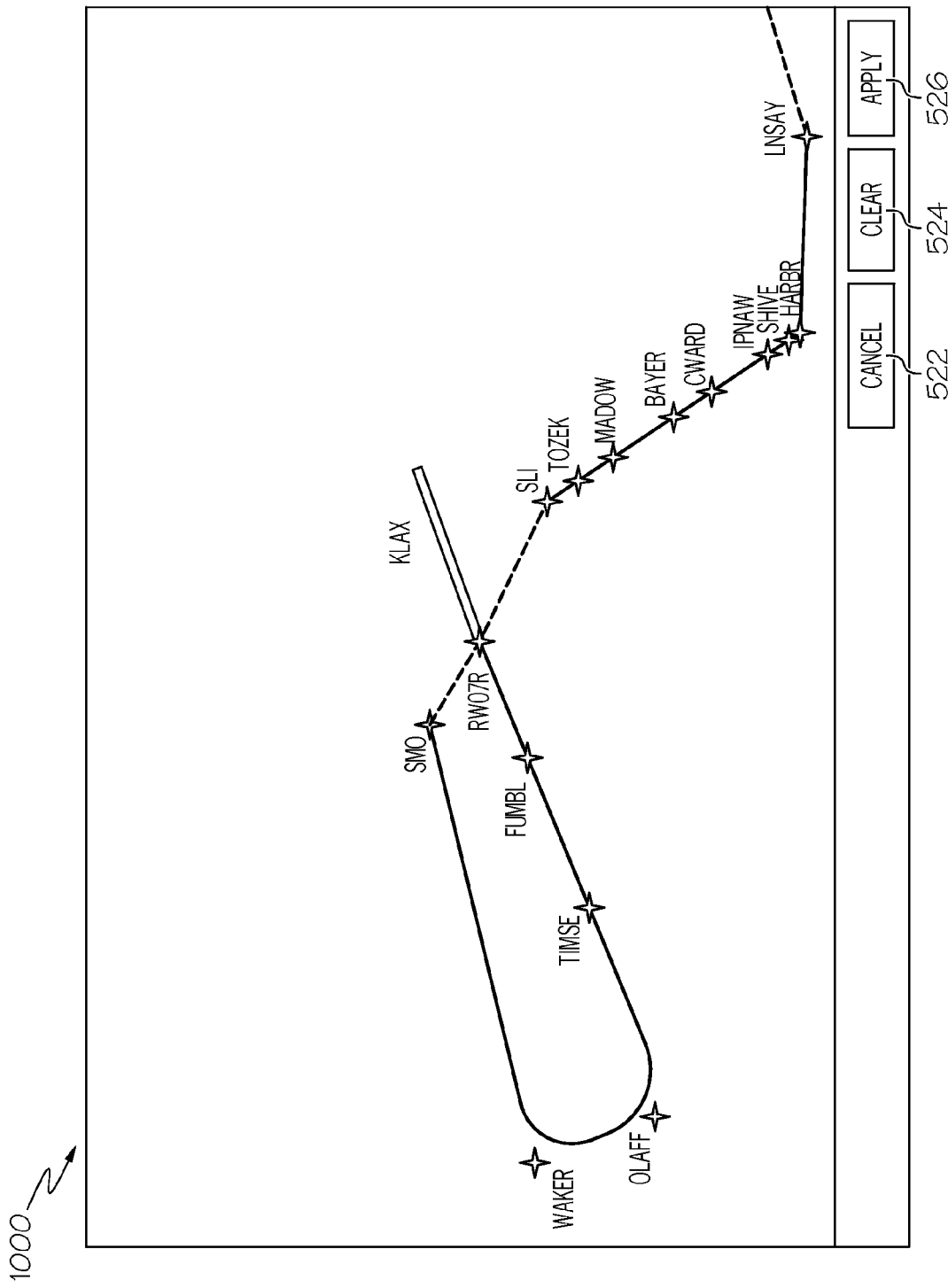
FIG. 10 illustrates an exemplary graphical representation of the approach course characterized by a graphically selected terminal area procedures.

FIG. 10 is a graphical representation 1000 of the temporary flight plan image that may be shown on display device 102 in display system 100 (FIG. 1). The displayed temporary flight plan then can be accepted by selecting the "Apply" button 526. However, if the graphical representation does not meet the requirements of the user, the temporary flight plan can be canceled by selecting the "Cancel" button 522. The terminal area procedure selection process may begin again, allowing the user to select the desired procedures. It should also be appreciated that the user may select a subset of the available terminal area procedures, if desired.

Figure 11:
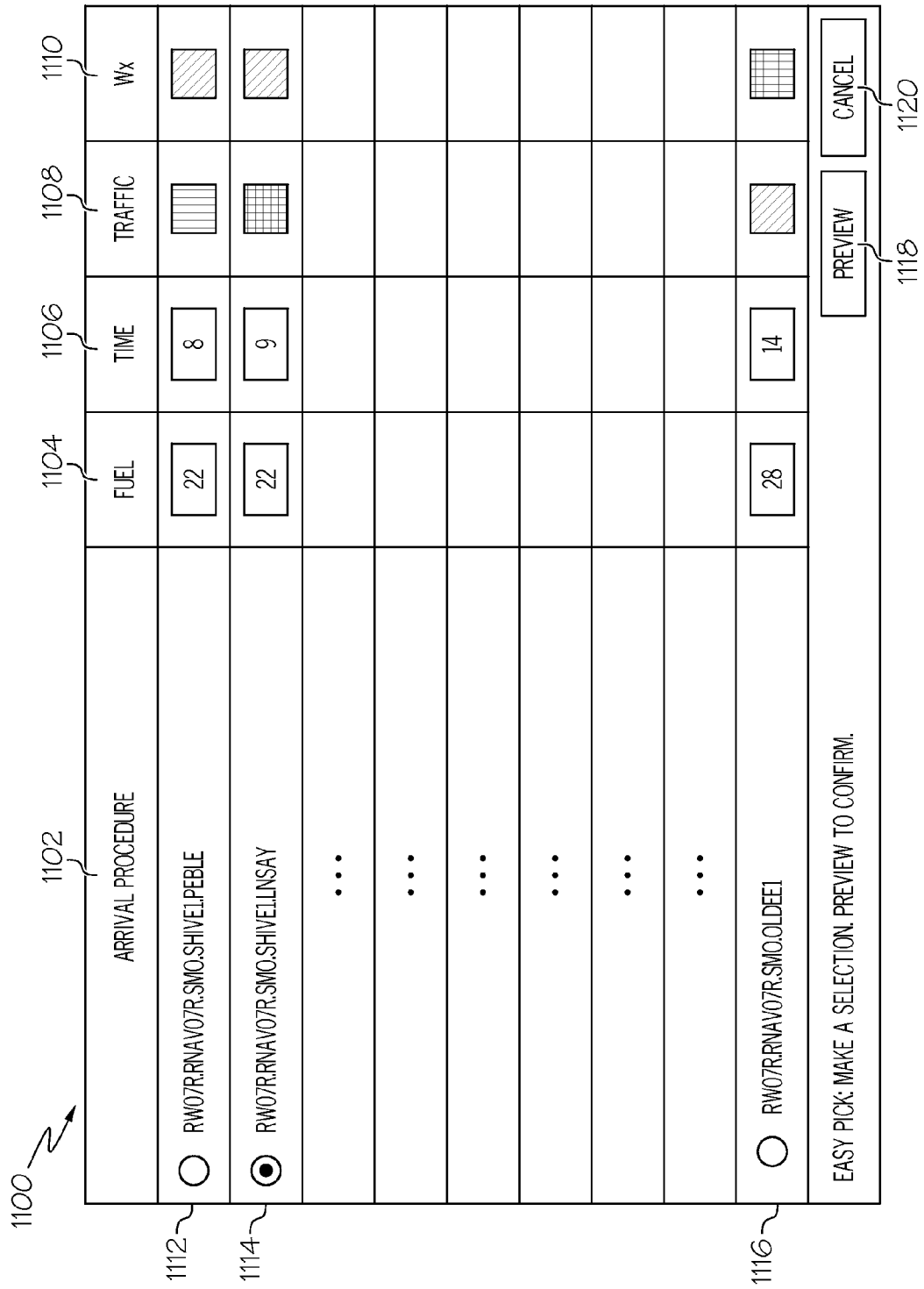
FIG. 11 is an exemplary spreadsheet of combinations of compatible approach transitions, STARs, and STAR transitions based on the selected runway and approach.

FIG. 11 is an exemplary spreadsheet 1100 of information about combinations of compatible approach transitions, STARs, and STAR transitions based on a selected runway and approach. The spreadsheet 1100 contains a plurality of columns containing characteristics of each compatible combination (e.g. Arrival Procedure 1102, Fuel 1104, Time 1106, Traffic 1108, Wx 1110), while the rows of the spreadsheet 1100 contain each compatible combination of the available terminal area procedures (e.g. RW07R.RNAV07R.SMO.SHIVE1.PEBLE 1112, RW07R.RNAV07R. SMO.SHIVE1.PEBLE 1114, RW07R.RNAV07R. SMO.OLDEE1 1116). The Arrival Procedure 1102 contains each terminal area procedure of that approach course, while the Fuel 1104, Time 1106, Traffic 1108 and Wx 1110 display additional information about the individual approach course. The Fuel 1104 and Time 1106 are displayed in a number formation allowing the user to make a detained comparison of the tradeoffs of each available approach course. In addition, the user is able to view the Traffic 1108 and Wx 1110 are displayed in color codes including red, yellow and green indicating high, moderate, and low, respectively. Spreadsheet 1100 would be displayed in response to a user selecting the Easy Pick function after graphically selecting the runway and approach. The user then would scroll through the available approach courses and find one that meets his requirements. For example, the user requires an approach course that requires low fuel consumption and is willing to tolerate moderate traffic, but is will not choose a high traffic approach course. Approach course RW07R.RNAV07R. SMO.SHIVE1.PEBLE 1114 meets these requirements and is selected by the user. The user then selected the preview button 1118 to graphically view the selection or the cancel button 1120 to return to the starting screen.

Figure 12:
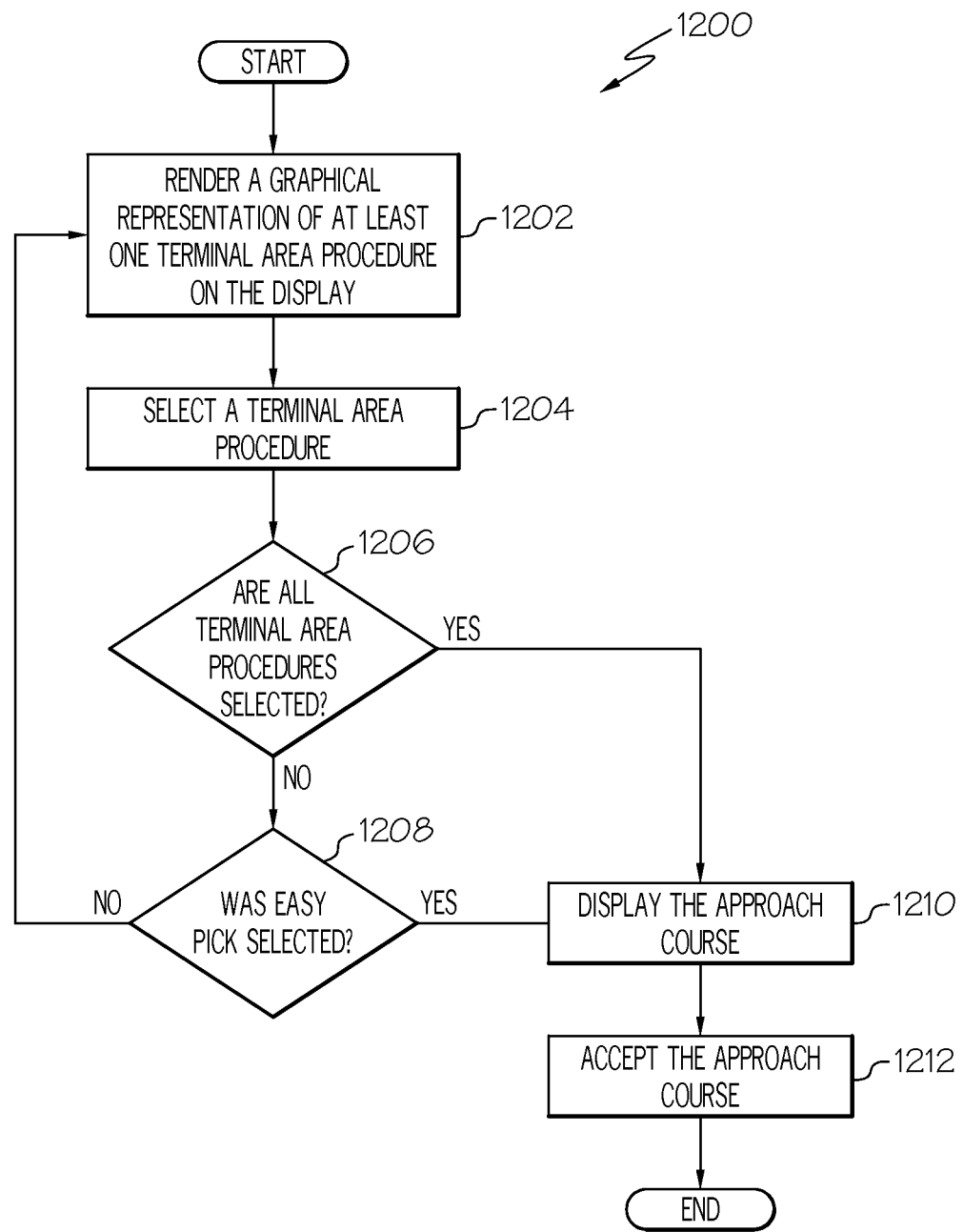
FIG. 12 is a flowchart of a display process for graphically selecting terminal area procedures in accordance with an embodiment.

FIG. 12 is a flowchart 1200 of a display process for graphically selecting an approach course in accordance with an embodiment. A graphical representation of at least one terminal area procedure is rendered on a display STEP 1202. In STEP 1204, the user selects a terminal area procedure. STEP 1206 determines if all terminal area procedures are selected. If all terminal area procedures are selected then the approach course is displayed (STEP 1210) and the user may accept the approach course (STEP 1212). However, if all terminal area procedures are not selected, STEP 1208 determines if the user selected the Easy Pick function. If the Easy Pick function was selected (STEP 1208) then the approach course is displayed (STEP 1210) and the user may accept the approach course (STEP 1212). However, if the user did not select the Easy Pick function or all terminal area procedures then subsequent compatible terminal area procedure are graphically generated (STEP 1202) and selected (STEP 1206). This process is repeated until all terminal area procedures have been selected or the user has selected the Easy Pick function.

Thus, it should be appreciated that there has been provided a system and method for graphically creating the approach course in a manner that provides immediate visual feedback of the terrain, traffic, and spatial orientation of the parameters. In addition, all selections are made without covering a substantial portion of the display or the features being displayed on the display including the traffic, weather, terrain, ADS-B IN, and the existing flight plan itself. Furthermore, this would enable the user to request clearance for an alternative approach course that could save fuel or time based on the user being able to visualize all available approach courses. It should also be appreciated that errors could be detected earlier because the user would be graphically visualizing each parameter instead of selecting from a list and later realizing that there was a selection error. While an exemplary embodiment of the present invention has been described above in the context of a fully functioning computer system (i.e., avionics display system 100), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for graphically creating a flight course on a display, the method comprising;
    determining, for each of a number of available terminal area procedures, whether a subsequent corresponding terminal area procedure is available;
    generating on a navigation display, a map showing an area surrounding an airport;
    superimposing on the map, for each of the number of available terminal area procedures, a symbolic graphical representation of (i) the terminal area procedure, and (ii) proximate to the terminal area procedure, a symbolic graphical representation of a subsequent corresponding terminal area procedure when it is determined that there is a subsequent terminal area procedure;

selecting on the navigation display a terminal area procedure from the number of available terminal area procedures; and removing unselected terminal area procedures from the map in response to selecting a terminal area procedure, wherein a resulting map image defines the flight course.

2. The method of claim 1 wherein a terminal area procedure is a runway procedure, and comprising superimposing on the map a symbolic graphical representation of the runway procedure, and the step of selecting comprises selecting the runway procedure.

3. The method of claim 2 further comprising superimposing a graphical representation of an approach procedure compatible with the selected runway procedure.

4. The method of claim 3 further comprising selecting the approach procedure and, in response to selecting the approach procedure, superimposing on the map a graphical representation of an approach transition procedure compatible with the selected approach procedure.

5. The method of claim 4 further comprising selecting the approach transition procedure, and in response to selecting the approach transition procedure, superimposing on the map a graphical representation of a STAR procedure compatible with the selected approach transition procedure.

6. The method of claim 5 further comprising selecting the STAR procedure, and in response to selecting the STAR procedure, superimposing on the map a graphical representation of a STAR transition procedure compatible with the selected STAR procedure.

7. The method of claim 6, wherein one or more selected terminal area procedures define a flight course, and further comprising:

accepting the flight course on the navigation display; and
inserting the flight course into a flight plan.

8. The method of claim 1 wherein the step of superimposing on the map comprises individually superimposing graphical representations of a compatible runway, approach, approach transition, STAR, and STAR transition procedures.

9. The method of claim 1 wherein the navigation display is a touchscreen input device and the step of selecting the at least one terminal area procedure comprises contacting the touchscreen.

10. The method of claim 3 further comprising:
selecting an Easy Pick function;
in response to selecting the Easy Pick function, displaying a plurality of compatible combinations of approach transitions, STARs, and
STAR transitions and their associated characteristics; and
selecting one of the plurality of compatible combinations.

11. The method of claim 1 further comprising positioning a cursor over the graphical representation of the terminal area procedure to display details of the terminal area procedure.

12. The method of claim 1 further comprising generating a dialog box when more than one terminal area procedure share at least one waypoint.

13. A display system for graphical creation of an approach course, the system comprising:

a display system, comprising a navigation display, for receiving and displaying terminal area procedures on a map showing an area surrounding an airport; and a processor operatively coupled to the display system and configured to generate a flight course by (i) determining, for each of a number of available terminal area procedures, whether a subsequent corresponding terminal area procedure is available;

(ii) superimposing on the map, for each of the number of available terminal area procedures, a symbolic graphical representation of the terminal area procedure, and proximate to the terminal area procedure, a symbolic graphical representation of a subsequent corresponding terminal area procedure when it is determined that there is a subsequent terminal area procedure;

(iii) selecting, on the navigation display, a terminal area procedure from the number of available terminal area procedures; and (iv) removing unselected terminal area procedures from the map in response to selecting a terminal area procedure, wherein a resulting map defines the approach course.

14. The system of claim 13 wherein the display comprises a touchscreen input device.

15. The system of claim 13 wherein the display comprises a cursor control input device.

16. The system of claim 13 wherein the processor is further configured to display a plurality of compatible combinations of approach transitions, STARs, and STAR transitions and their associated characteristics in response to a user selecting an Easy Pick function.

17. The system of claim 13 wherein the processor is further configured to superimpose on the map a symbolic graphical representation of a terminal area procedure comprised of at least one runway, approach, approach transition, STAR, and STAR transition.

18. The system of claim 13 wherein the processor is further configured to (1) display details of a terminal area procedure in response to a cursor placed over a respective symbolic graphical representation of the terminal area procedure, and (2) generate a dialog box when more than one terminal area procedure share at least one waypoint.

19. The system of claim 13 wherein the processor is further configured to accept the approach course and insert the approach course into a flight plan.

* * * * *